United States Patent [19]

Snitzer et al.

[11] 4,290,371

[45] Sep. 22, 1981

[54] TABLE AND METHOD OF ASSEMBLY

[75] Inventors: Morton Snitzer; Gary L. Fehrenbacher, both of Evansville, Ind.

[73] Assignee: Indiana Wood Specialty, Inc., Evansville, Ind.

[21] Appl. No.: 72,615

[22] Filed: Sep. 5, 1979

[51] Int. Cl.$^3$ ............................ A47B 3/06; F16B 7/00
[52] U.S. Cl. .................................. 108/159; 108/153; 108/157; 403/401; 403/403; 403/294; 403/295
[58] Field of Search .............. 108/153, 155, 159, 157, 108/158; 403/401, 402, 403, 294, 295, 292

[56] References Cited

U.S. PATENT DOCUMENTS

| | | | |
|---|---|---|---|
| 691,049 | 1/1902 | D'Espine | 403/294 |
| 893,676 | 7/1908 | Tschantz | 403/402 |
| 950,739 | 3/1910 | Baum | 108/159 |
| 1,322,303 | 11/1919 | Schroder | 403/294 |
| 1,537,678 | 5/1925 | Jensen | 403/294 |
| 2,613,957 | 10/1952 | Ritter | 108/153 X |
| 2,615,770 | 10/1952 | Curtis | 108/155 |
| 3,425,721 | 2/1969 | Agee | 403/294 |
| 4,112,855 | 9/1978 | Colby | 108/159 |
| 4,138,952 | 2/1979 | Hodson | 108/159 X |

*Primary Examiner*—James T. McCall
*Attorney, Agent, or Firm*—William E. Mouzavires

[57] ABSTRACT

A table that may be readily assembled or disassembled is formed by a plurality of pairs of legs which are joined to each other by elongated locking strips received in longitudinally extending channels formed in the legs and opening at throat portions into mutually engaging mitered surface portions of the legs. The throat portions of the channels are of a reduced dimension, and the locking strips are provided with resilient deformable tabs received in the channels to prevent separation of the legs of each pair. The leg pairs are interconnected by horizontally extending struts which are fixed to two legs of each adjacent pair of legs. The table top rests on the legs and has recessed depending portions received within the space enclosed by the legs and struts to prevent transverse movement of the table top while at the same time preventing the legs of each pair from moving about their locking strips.

9 Claims, 5 Drawing Figures

U.S. Patent     Sep. 22, 1981     4,290,371
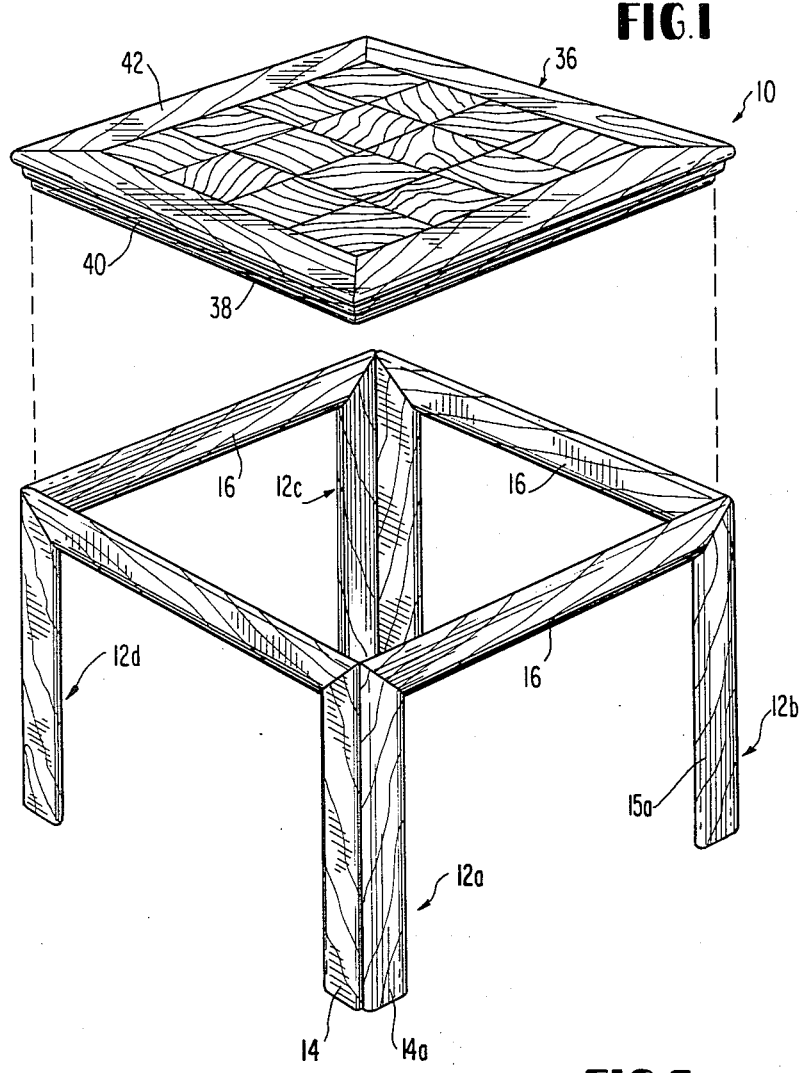
FIG.1
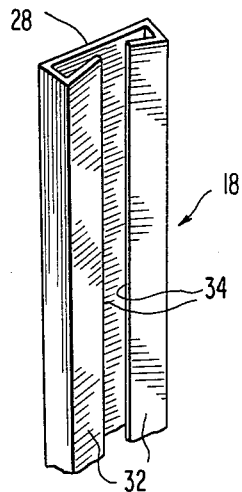
FIG.3
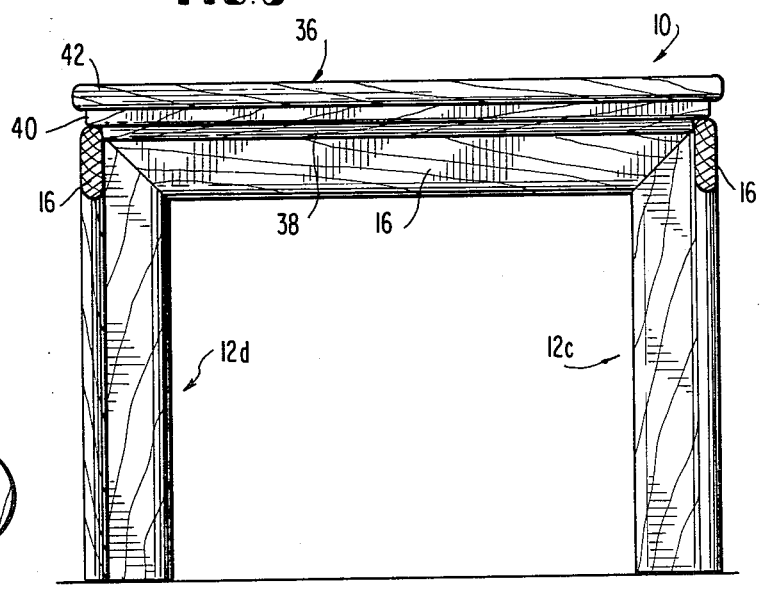
FIG.4
FIG.5
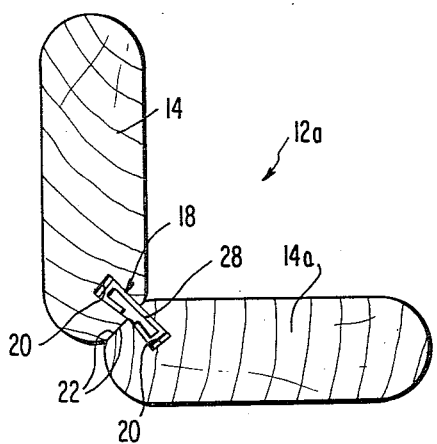
FIG.2

TABLE AND METHOD OF ASSEMBLY

OBJECTS OF INVENTION

The present invention resides in a table and has for one of its main objects, the provision of a table that may be easily assembled or disassembled and arranged in a compact body for storage or shipment. Included herein is a table that consists of a minimum of parts that may be supplied by standard pieces and which may be assembled or disassembled in the home without requiring any special tools.

Another object of the present invention is to provide such a table which may be made from decorative pieces of wood for use as a decorative home or office furnishing. Also included is the provision of such a table that may be manufactured at relatively low cost to increase its availability to consumers and yet without sacrificing appearance or durability of the table.

SUMMARY OF INVENTION

In summary, the table of the present invention is comprised of a plurality of pairs of legs which pairs are joined to each other by elongated locking strips received in channels formed along mutually contacting surfaces of the legs. The locking strips are formed with resilient and deformable tabs received in the channels by inserting the strips longitudinally through the channels from one of the ends, preferably the bottom ends, of the legs. The channels are provided with a throat portion of reduced dimension which maintains the tabs within the channels to prevent separation of the legs of each pair.

The several pairs of legs are interconnected to each other by horizontal strut or rail members so that the pairs of legs when so interconnected define a predetermined configuration, typically a rectangular or square configuration. The horizontal struts are fixed at opposite ends to two legs of adjacent pairs of legs so that when the table is disassembled, each horizontal strut together with its legs, form a single piece. The table top rests on the legs and struts and has a depending recessed portion or shoulder about its periphery which is received within the space enclosed by the legs and struts to prevent transverse movement of the table top while, at the same time, maintaining the desired configuration of the legs and preventing the legs of each pair from movement about their locking strips.

DRAWINGS

Other objects and advantages of the present invention will become apparent from the following more detailed description taken in conjunction with the attached drawings in which:

FIG. 1 is a perspective assembly view of a table constituting a preferred embodiment of the present invention;

FIG. 2 is an enlarged cross-sectional view of a pair of legs included at one of the corners of the table;

FIG. 3 is a fragmental perspective view of a locking tab used to interlock the pairs of legs of the table; and FIG. 4 is a fragmental cross-sectional view of an edge portion of one of the table legs illustrating a channel therein;

FIG. 5 is an elevational view of the table as seen from one side thereof and with certain portions shown in cross section.

DETAILED DESCRIPTION

Referring now to the drawings in detail, there is shown a table generally designated 10 constituting a preferred embodiment of the present invention. The illustrated table has a generally square-like configuration and includes a plurality of pairs of legs, the pairs being designated 12a, 12b, 12c and 12d, and being located at the four corners of the table. Each pair of legs includes two legs, for example, pair 12a includes legs 14 and 14a, which are joined together as will be described, and the four pairs of legs shown are interconnected by horizontal strut members or rails 16. It will be noted that each rail 16 is fixed at its opposite ends to one of the legs of the pairs of legs. Thus, for example, leg 14a of pair 12a and leg 15a of pair 12b are fixed to a common strut member or rail 16, so that legs 14a, 15a and rail 16 constitute a one-piece member. The same construction is true for the remaining legs and rails so that in the illustrated embodiment, there are four leg and rail units each consisting of two legs interconnected by a rail.

Referring now to FIGS. 2, 3 and 4, each pair of legs at each of the corners of the table are interconnected by a locking strip generally designated 18 which is received in elongated channels 20 formed along the edge portions 22 of each of the legs. Edge portions 22 of the legs are mitered surfaces extending in the shown embodiment, substantially throughout the length of the legs. Each of the channels 20 have a base 24 and a throat portion 26 of narrower dimension, and it will be seen, that one of the sides 23 of each of the channels extends at an angle from the base 24 to the mitered surface 22 as shown in FIG. 4. The other side of the channel extends along a straight line between the base and the mitered surface.

In the preferred embodiment shown, locking strips 18 each include an elongated rectangular base portion 28 having a pair of tabs 32 extending inwardly from the opposite side walls of the strip and terminating in free edges 34 which are spaced from each other and also spaced from the base portion 28. Tabs 32 extend at an angle relative to the base portion of the locking strips for a purpose to become apparent. In the preferred embodiment, the locking strips are formed from a suitable plastic material of high durability and strength. However, other materials may be employed.

In order to interconnect the legs of each pair of legs, a locking strip 18 is inserted into the channels 20 with the tabs 32 facing outwardly of the table as shown in FIG. 2. The narrow throat portions 26 of the channels will serve to deform tabs 32 inwardly so as to obtain a secure interfitting engagement between the locking strips and the wall surfaces of the channels 20. It should further be noted that in the preferred embodiment, channels 20 extend substantially throughout the length of the legs and open into the bottom surfaces of the legs. Insertion of the locking strips is through the bottoms of the legs and, of course, removal is outwardly from the bottoms of the legs. Because of the dimensioning of the tabs 32 and the narrowed throat portions 26 of the channels, once the locking strips are inserted in the channels, the legs of each pair of legs will not be transversely separable because the tabs will be retained within the channels by the throat portions. Moreover, because of the tight fit between the locking strips and the leg channels, relative longitudinal movement between the legs of each pair will be inhibited, although the fit is designed to permit intentional removal of the locking strip longitudinally from the channel when it is desired to disassemble the table.

The table top 36 in the preferred embodiment shown includes an underlying recess portion 38 which is dimensioned to fit snugly within the confines of the legs and rails 16 so as to prevent relative movement between the pair of legs while, at the same time, preventing horizontal movement of the table top relative to the legs. In addition, a shoulder 40 is formed on the underside of the table top adapted to rest on the upper edges of the legs and rails as shown in FIG. 5. Also, in the preferred embodiment, for decorative purposes, the table top has an upper edge portion 42 which extends outwardly beyond the recess and shoulder portions 38 and 40.

In positioning the table top 36, it is lowered between the legs and rails until it squarely rests on them with the underlying recessed portion 38 located within the confines of the legs and rails so as to lock them against relative movement. Moreover, the table top 36 is prevented from moving in a horizontal plane relative to the legs and rails by virtue of the confinement of the underlying recessed portion 38 of the table top. The installation of the table top will thus rigidify the entire structure, and thus no positive fasteners such as screws, bolts, nails, etc., are required to fasten the table top to the legs. Instead, the table top is maintained in position solely by its own weight and its interfitting relationship with the legs and rails.

From the above it will be seen that the table, in the preferred embodiment shown, includes basically five pieces, that is, four leg and rail units and one table top. In addition, four locking strips 18 are provided for interlocking the pairs of legs at each of the corners. In order to assemble the table, it should now be apparent that the locking strips are inserted through channels 20 in each of the pairs of legs at the four corners of the table, to define an upstanding rectangular enclosure with an open top as illustrated in FIG. 1. Then the table top 36 is simply lowered into the space defined by the legs and rail units until the shoulder 40 rests upon the top edges of the leg and rail units as shown in FIG. 5. Once the table top is so installed, the assembly is complete, and no fasteners are needed to positively interconnect the various members together.

Although the preferred embodiment utilizes a table top which has portions received within the confines of the legs and rail units, it may be possible to utilize other table top configurations and constructions wherein the table top would enclose the leg and rail units while, at the same time, providing the same securement functions described above.

What is claimed is:

1. A table capable of being readily assembled or disassembled comprising, a plurality of spaced pairs of legs, means releasably joining each pair of legs along mutually engaging longitudinal surfaces, said means including elongated channels extending longitudinally and substantially throughout each leg of each pair of legs and opening in a direction transversely of the legs into said mutually engageable surfaces at opposed throat portions to define a passageway extending substantially throughout each pair of legs, said channels and the passages formed thereby extending and opening into the bottom surfaces of the legs respectively, each channel having a base dimension greater in width than the throat thereof, a plurality of elongated locking strips respectively located in the channels of each pair of legs and extending substantially throughout the length of the channels to connect the pair of legs together, said locking strips having a base portion spanning the channels and a plurality of resilient deformable tabs overlying the base portion and respectively received in the channels to prevent transverse separation of the legs of each pair, said channels each including a first side extending at an angle to the base thereof and engaging one of the tabs of the associated locking strips, and a second side opposite the first side engaging a portion of the base portion of the associated locking strip, the tabs being attached to the opposite sides of the base portion of the locking strip and extending inwardly at an angle towards the plane of the associated base portion of the strip and terminating in free edges spaced from each other, and wherein the table further includes generally horizontal strut members respectively connecting each adjacent pair of legs to hold the pairs of legs in a predetermined spaced relationship defining a space of predetermined configuration, and a table top supported over and by said legs and struts and having means preventing relative movement between said pairs of legs.

2. The table defined in claim 1 wherein said means preventing relative movement of said pairs of legs includes recessed underportions of the table top freely received within the space defined by the legs and struts in close fitting relationship, the table being free of any positive fasteners between the table top and the legs and struts.

3. The table defined in claim 1 wherein said locking strips are formed from plastic material.

4. The table defined in claim 1 wherein two legs of adjacent pairs of legs are joined to each other in one piece by a common strut member, each of said strut members and its associated legs being removable as a single unit upon removal of the associated locking strips.

5. The table defined in claim 4 wherein there is included four of said pairs of legs joined by said strut members to form a rectangular configuration.

6. The table defined in claim 1 wherein said mutually engaging surfaces on the legs of each pair are miter surfaces.

7. The table defined in claim 1 wherein said channels extend to the bottoms of the legs and wherein said locking strips are insertable or removable from the channels through the bottoms of the legs.

8. The table defined in claim 1 wherein two legs of adjacent pairs of legs are joined to each other in one piece by a common strut member, each of said strut members and its associated legs being removable as a single unit upon removal of the associated locking strips.

9. The table defined in claim 8 wherein the legs and strut members are made from wood, the locking strips are made from plastic, and said mutually engaging surfaces on the legs of each pair are miter surfaces.

* * * * *